United States Patent [19]

Ito

[11] Patent Number: 5,755,379

[45] Date of Patent: May 26, 1998

[54] HEATING APPARATUS FOR VEHICLE

[75] Inventor: Yuji Ito, Ichinomiya, Japan

[73] Assignee: Denso Corporation, Kariya, Japan

[21] Appl. No.: 901,370

[22] Filed: Jul. 28, 1997

[30] Foreign Application Priority Data

Aug. 1, 1996 [JP] Japan ................................. 8-203326

[51] Int. Cl.$^6$ ................................................ B60H 1/02
[52] U.S. Cl. ................................. 237/12.3 R; 237/2
[58] Field of Search ...................... 237/12.3 R, 2; 165/43

[56] References Cited

U.S. PATENT DOCUMENTS 4,993,377  2/1991  Itakura .

FOREIGN PATENT DOCUMENTS

A-3-57877  3/1991  Japan .

A-6-92134  3/1994  Japan .

*Primary Examiner*—Henry A. Bennett
*Assistant Examiner*—Derek S. Boles
*Attorney, Agent, or Firm*—Harness, Dickey & Pierce, PLC

[57] ABSTRACT

A cooling water temperature sensor is disposed at an outlet side of a water jacket of an engine to detect a temperature of cooling water, and is electrically connected to an air conditioning ECU through an engine ECU and two communication lines. When a cooling water temperature detected by the cooling water temperature sensor is higher than an upper limit of an allowable range or is lower than a lower limit of the allowable range, it is determined that the cooling water temperature sensor has a failure, and a viscous clutch of a viscous heater is turned off. At this time, a driving force of the engine is not transmitted to the viscous heater to prevent an abnormal heating of viscous fluid in a heat-generating chamber of the viscous heater.

12 Claims, 9 Drawing Sheets

HEATING APPARATUS FOR VEHICLE

CROSS-REFERENCE TO RELATED APPLICATION

This application is related to and claims priority from Japanese Patent Application No. Hei. 8-203326 filed on Aug. 1, 1996, the contents of which are hereby incorporated by reference.

BACKGROUND OF THE INVENTION

1. Field of the Invention

The present invention relates to a heating apparatus for a vehicle, in which a heat-generating unit using a shearing force, for increasing a temperature of cooling water for cooling a water-cooled engine, is used as a supplementary heating source for heating a passenger compartment.

2. Description of Related Art

Conventionally, as a heating apparatus for a vehicle, a hot water type heating apparatus for heating a passenger compartment has been generally known. In the hot water type heating apparatus, cooling water for cooling a water-cooled engine is supplied to a heater core disposed in a duct, and air heated while passing through the heater core is blown into the passenger compartment by a blower to heat the passenger compartment of the vehicle.

In recent years, it is desired to improve an efficiency of the engine installed in an engine compartment. When the efficiency of the engine is improved, a load of the engine is decreased so that cooling water for cooling the engine cannot be sufficiently heated. Further, in a case of a vehicle having a diesel engine or a lean burn engine, heat generated in the engine is too small to heat the cooling water with engine sufficiently. In this case, because a temperature of cooling water to be supplied to a heater core cannot be maintained at a predetermined temperature (e.g., 80° C.), there occurs a problem in that a heating capacity for the passenger compartment is insufficient.

To overcome such a problem, as disclosed in U.S. Pat. No. 4,993,377 and JP-A-3-57877, the following heating apparatus for a vehicle is conventionally proposed. In the heating apparatus for a vehicle, a heat-generating unit using a shearing force, for heating cooling water to be supplied to a heater core from an engine, is disposed in a cooling water circuit, and the heat-generating unit is operated when the cooling water temperature is lower than a set cooling water temperature to improve the heating capacity for the passenger compartment.

The heat-generating unit transmits a driving force of the engine to a shaft through a belt transmitting mechanism and the electromagnetic clutch. A heat-generating chamber is formed in a housing of the heat-generating unit, and a cooling water passage is formed at an outer periphery of the heat-generating chamber. A rotor which rotates integrally with the shaft is disposed in the heat-generating chamber, and a shearing force generated by a rotation of the rotor is applied to viscous fluid such as silicon oil having a high viscosity, sealed in the heat-generating chamber to generate heat. The cooling water circulating in the cooling water passage is heated by the generated heat.

In the conventional heating apparatus, according to a temperature of the cooling water, it is determined whether the heat-generating unit is turned on or off. When a cooling water temperature sensor fails and an abnormal signal is output, a rotation of the rotor of the heat-generating unit may be not stopped or the rotor may be not rotated. When the rotation of the rotor does not stop, the viscous fluid of the heat-generating unit may be abnormally heated.

Particularly, in a case where a silicon oil having a high viscosity is used as the viscous fluid, when the silicon oil is abnormally heated so that the temperature of the silicon oil is higher than 250° C., heat deterioration of the viscous fluid and mechanical deterioration due to a shearing force of the rotor may be generated. When the mechanical deterioration and the heat deterioration are generated once, the viscosity of the viscous fluid decreases. Thus, there occurs a problem in that a heat-generating efficiency of the heat-generating unit decreases even if a shearing force is applied to the viscous fluid by the rotor after correcting the cooling water temperature sensor.

SUMMARY OF THE INVENTION

In view of the foregoing problems of the prior art, it is an object of the present invention to provide a heating apparatus for a vehicle, which can prevent an abnormal heat generated in viscous fluid by a failure of viscous fluid temperature physical amount detecting unit for detecting a physical amount relative to a temperature of the viscous fluid in a heat-generating chamber.

Further, it is another object of the present invention to provide a heating apparatus for a vehicle, which can prevent a decrease of a viscosity of the viscous fluid and a decrease of a heat-generating efficiency of the viscous fluid.

According to the present invention, a heating apparatus for a vehicle having a water-cooled engine, includes a heating heat exchanger disposed in a duct for heating a passenger compartment by heat-exchange between cooling water having cooled the engine and air to be blown into the passenger compartment, and a heat-generating unit using a shearing force. The heat-generating unit has a rotor which rotates when a driving force is applied thereto and a heat-generating chamber for sealing therein viscous fluid which generates heat for heating the cooling water to be supplied to the heating heat exchanger when a shearing force generated by a rotational force of the rotor is applied to the viscous fluid. The heat-generating unit is operated when a viscous fluid temperature physical amount detected by a viscous fluid temperature physical amount detecting unit is lower than a set value and is stopped when the viscous fluid temperature physical amount detecting unit has a failure.

In this way, when the viscous fluid temperature physical amount detecting unit has a failure, the driving force of a driving source is not transmitted to the rotor so that a rotation of the rotor is stopped. Since a shearing force of the rotor is not applied to the viscous fluid in the heat-generating chamber, an abnormal heating of the viscous fluid in the heat-generating chamber can be prevented. Therefore, the heat deterioration of the viscous fluid and the mechanical deterioration due to a shearing force are not generated, and the viscosity of the viscous fluid is not decreased. Thus, after correcting a failure of the viscous fluid temperature physical amount detecting unit, a sufficient heating capacity can be obtained when a heating operation for the passenger compartment is necessary.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention are described hereinafter with reference to the accompanying drawings.

A first preferred embodiment of the present invention will be described with reference to FIGS. 1–9.

Figure 1:
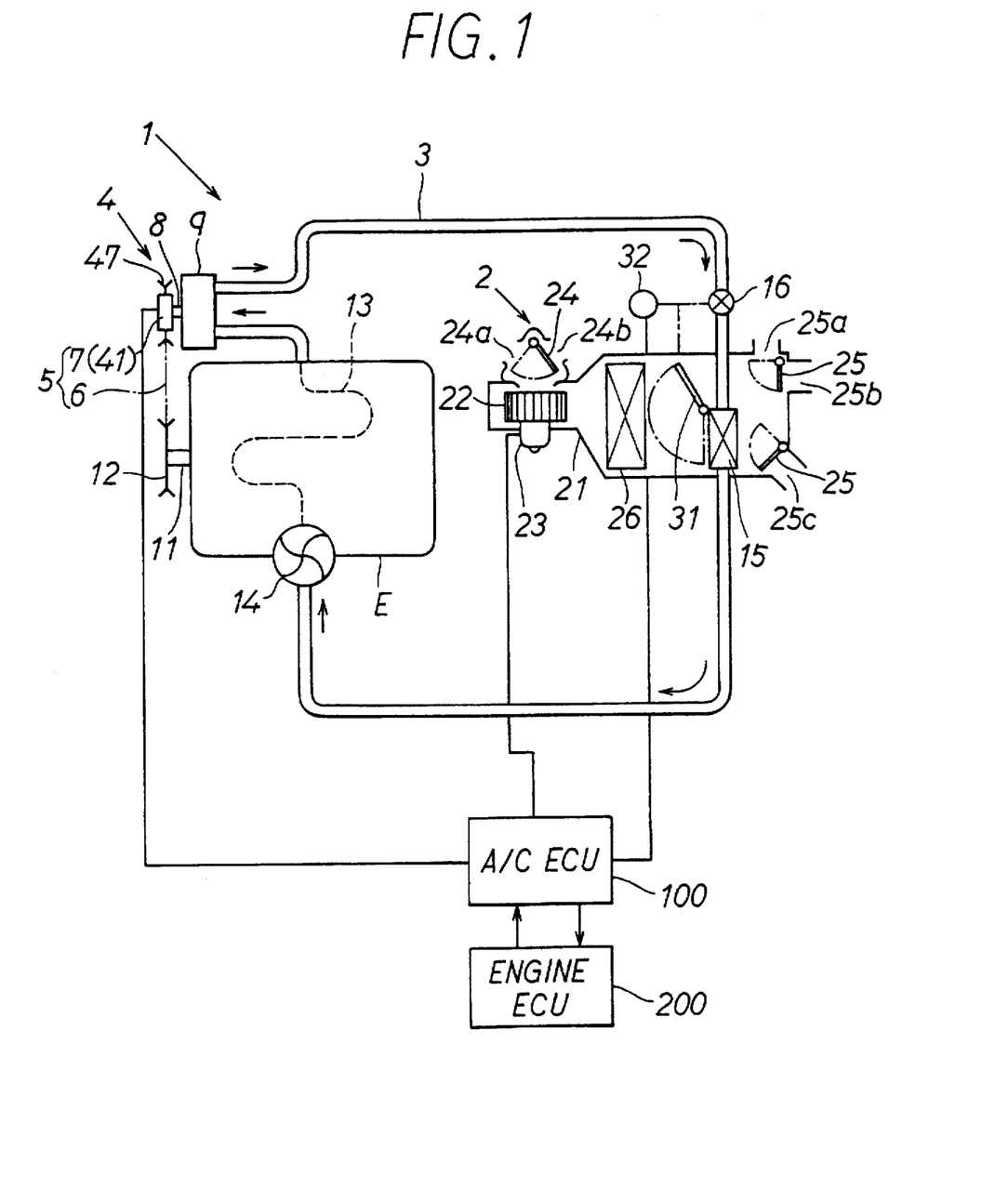
FIG. 1 is a schematic diagram showing an entire construction of an air-conditioning apparatus for a vehicle according to a first preferred embodiment of the present invention.

As shown in FIG. 1, an entire system 1 for a vehicle is equipped with a water-cooled diesel engine E (hereinafter referred to as "engine") disposed in an engine compartment of the vehicle, an air-conditioning unit 2 for air-conditioning a passenger compartment, a cooling water circuit 3 through which cooling water circuits, a heat-generating unit 4 using a shearing force 4 for heating cooling water for cooling the engine E, an air-conditioning ECU 100 for controlling the air-conditioning unit 2, and an engine ECU 200 for controlling the engine E.

The engine E is a driving source for driving and rotating the heat-generating unit 4. A crank pulley 12 connected to a V-belt 6 described later is attached to an output shaft (i.e., crankshaft) 11 of the engine E. The engine E is provided with a cylinder block and a water jacket 13 around a cylinder head. The water jacket 13 is disposed in a cooling water circuit 3 through which the cooling water for cooling the engine E circuits.

In the cooling water circuit 3, there is disposed a water pump 14 for compulsorily pumping the cooling water, a radiator (not shown) for cooling the cooling water by heat exchanging the cooling water and air, a heater core 15 for heating air by heat exchanging the cooling water and air, a water valve 16 for controlling a supply and an interruption of the cooling water into the heater core 15, and the like. The water pump 14 is disposed at an upstream side of the water jacket 13 of the engine E and is rotated by the output shaft 11 of the engine E.

The water valve 16 is a warm water valve for adjusting an opening degree of a cooling water pipe (i.e., cooling water passage) through which the cooling water is supplied to the heater core 15. In the first embodiment, the water valve 16 is connected to a servomotor 32 of an air-mixing damper 31 through a ring plate or a plurality of ring plates so that the water valve 16 is operatively linked with the air-mixing damper 31.

The air-conditioning unit 2 includes a duct 21, a blower 22, a refrigeration cycle, and the heater core 15. At an upstream air side of the duct 21, there is rotatably provided an inside/outside air switching damper 24 for selectively opening and closing an outside air inlet 24a and an inside air inlet 24b to switch an air inlet mode. At a downstream air side of the duct 21, there is rotatably provided an air mode switching damper 25 for selectively opening and closing a defroster air outlet 25a, a face air outlet 25b and a foot air outlet 25c to switch an air outlet mode.

The blower 22 is rotated by a blower motor 23 to generate an air flow toward the passenger compartment in the duct 21.

The refrigerant cycle includes a compressor (i.e., refrigerant compressor), a condenser (i.e., a refrigerant condenser), a receiver (i.e., gas-liquid separator), an expansion valve (i.e., decompressing device), the evaporator (i.e., refrigerant evaporator) 26, and refrigerant pipes connecting the parts of the refrigerant cycle in a round shape.

The compressor is equipped with an electromagnetic clutch (hereinafter referred to as "clutch") 27, and compresses refrigerant sucked from the evaporator 26 and discharges the compressed refrigerant toward the condenser. The clutch 27 is connected to a crank pulley 12 (see FIG. 2) attached to the output shaft 11 of the engine E through the V-belt 6. When an electromagnetic coil of the clutch 27 is electrified, an output portion (i.e., armature, inner hub) is attracted to an input portion of the rotor so that a driving force of the engine E is transmitted to the compressor. The evaporator 26 is disposed in the duct 21 to cool air flowing therethrough.

The heater core 15 is disposed in the duct 21 at a downstream air side (i.e., downwind side) of the evaporator 26 and is connected to the cooling water circuit 3 at a downstream side of the heat-generating unit 4 with reference to the flow direction of the cooling water. The heater core 15 heats air by heat-exchanging the air having passed through the evaporator 26 and the cooling water.

At an upstream air side of the heater core 15, there is rotatably provided an air-mixing damper 31. The air-mixing damper 31 adjusts a ratio between an amount of air (i.e., warm air) passing through the heater core 15 and an amount of air (i.e., cool air) bypassing the heater core 15 so that a temperature of air blown into the passenger compartment can be adjusted. The air-mixing damper 31 is driven by an actuator (i.e., damper driving means) such as a servomotor 29 through a ring plate or a plurality of ring plates.

Next, the heat-generating unit 4 using a shearing force will be described briefly with reference to FIGS. 1 through 4.

The heat-generating unit 4 includes a belt transmitting mechanism 5 connected to and driven by the output shaft 11 of the engine E, and a viscous heater 9 having a shaft 8.

Figure 2:
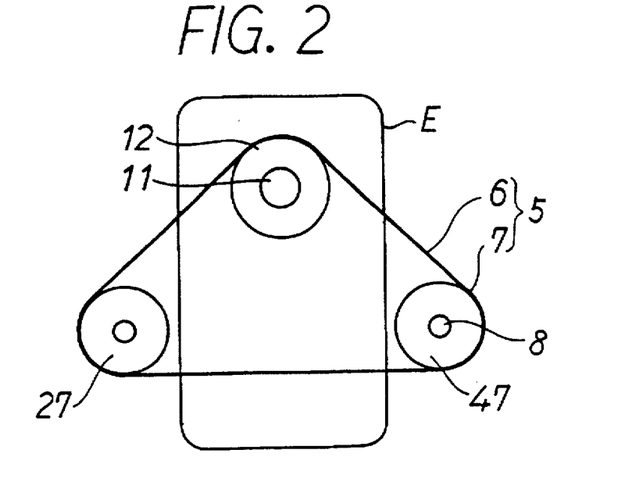
FIG. 2 is a schematic diagram showing an engine and a belt transmitting mechanism according to the first embodiment.

The belt transmitting mechanism 5 includes a multi-stage type V-belt 6 hung on the crank pulley 12 attached to the output shaft 11 of the engine E and an electromagnetic clutch 7 (hereinafter referred to as "viscous clutch") connected to and driven by the output shaft 11 of the engine E through the V-belt 6.

The V-belt 6 transmits a driving force (i.e., driving power) of the engine E to a shaft 8 of the viscous heater 9 through the viscous clutch 7. In the first embodiment, the V-belt 6 is hung on both of the clutch 27 and the viscous clutch 7.

Figure 3:
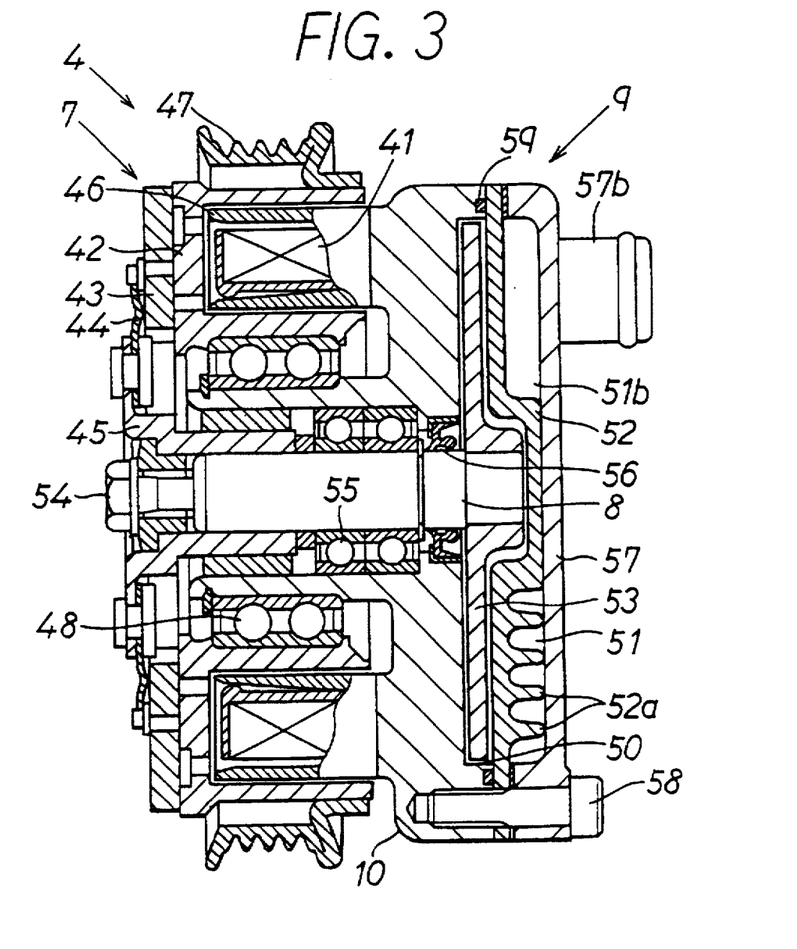
FIG. 3 is a cross-sectional view showing a viscous clutch and a viscous heater according to the first embodiment.

The viscous clutch 7 transmits the driving force of the engine E from the shaft 11 of the engine E to the shaft 8 of the viscous heater 9. As shown in FIG. 3, the viscous clutch 7 includes an electromagnetic coil 41 for generating a magnetomotive force when being electrified, a rotor 42 rotated by the engine E, an armature 43 attracted toward the rotor 42 rotated by the magnetomotive force of the electromagnetic coil 41, and an inner hub 45 connected to the armature 43 with a plate spring 44 and supplying a rotational force to the shaft 8 of the viscous heater 9.

The electromagnetic coil 41 is formed by winding a conductive lead wire covered with an insulating material. The electromagnetic coil 41 is disposed in the stator 46 and is fixedly molded in the stator 46 with an epoxy resin. The stator 46 is fixed on a front surface of a housing 10 of the viscous heater 9.

A V-pulley 47 having the V-belt 6 on a periphery thereof is connected to the rotor 42 by connecting means such as welding. The rotor 42 is a rotating body which always rotates by the driving force of the engine E, transmitted thereto through the V-belt 6. The rotor 42 is formed of magnetic material to have a U-shaped cross section and is rotatably supported on an outer periphery of the housing 10 of the viscous heater 9 through a bearing 48 disposed in an inner periphery thereof.

The armature 43 has a friction surface formed in a ring-shaped plate, which is opposed to a friction surface of the rotor 42, formed in a ring-shaped plate, by an air gap therebetween. For example, a clearance between the friction surfaces is 0.5 mm. The armature 43 is made of magnetic material. When the armature 43 is attracted to the friction surface of the rotor 42 by the electromotive force of the electromagnetic coil 41, the driving force of the engine E is transmitted from the rotor 42 to the armature 43.

The plate spring 44 is fixed to the armature 43 at an outer peripheral side by fixing means such as a rivet and is fixed to the inner hub 45 at an inner peripheral side by fixing means such as a rivet. The plate spring 44 is an elastic member. When the electric current supplying to the electromagnetic coil 41 is stopped, the plate spring 44 displaces the armature 43 in a direction (i.e., the left direction in FIG. 3) so that the armature 43 is separated (released) from the friction surface of the rotor 42 to return the armature 43 to an initial position thereof.

The inner hub 45 is used as an output portion of the viscous clutch 7. The input side of the inner hub 45 is connected to and driven by the armature 43 through the plate spring 44 and the output side of the inner hub 45 is connected to the shaft 8 of the viscous heater 9 with a spline fitting connection.

The viscous heater 9 is a supplementary heating source of the engine E which is the main heating source. The viscous heater 9 includes the shaft 8 rotated by the driving force of the engine E through the V-belt 6 and the viscous clutch 7, the housing 10 for rotatably supporting the shaft 8, a separator 52 for dividing an inner space of the housing 10 into a heat-generating chamber 50 and a cooling water passage 51, and a rotor 53 rotatably disposed in the housing 10.

The shaft 8 is an input shaft which is fixedly fastened to the inner hub 45 of the viscous clutch 7 by fastening means such as a bolt and rotates integrally with the armature 43. The shaft 8 is rotatably disposed in an inner periphery of the housing 10 through a bearing 55 and a sealing member 56. The sealing member 56 employs an oil-seal for preventing a leakage of the viscous fluid.

The housing 10 is made of a metallic member such as aluminum alloy. A cover 57 formed in a ring-shaped plate is fixedly fastened to a rear end of the housing 10 by a fastening member 58 such as a bolt and a nut. The separator 52 and a sealing member 59 is attached on a surface where the housing 10 and the cover 57 are joined. The sealing member 59 employs an C-ring for preventing a leakage of the cooling water.

The separator 52 is a partition member which is made of a metallic member such as aluminum alloy, which is superior in heat conductivity. An outer peripheral portion of the separator 52 is sandwiched between a cylindrical portion of the housing 10 and a cylindrical portion of the cover 57. The heat-generating chamber 50 for sealing viscous fluid (e.g., silicon oil) which generates heat when a shearing force is applied thereto is formed between a front end surface of the separator 52 and a rear end surface of the housing 10.

The cooling water passage 51 is formed between a rear end surface of the separator 52 and an inner surface of the cover 57, and is liquid-tightly partitioned from the outside. The cooling water for cooling the engine E flows through the cooling water passage 51. Further, a plurality of fin portions 52a having a substantially arcuate shape, for efficiently transmitting heat of the viscous fluid to the cooling water is integrally formed on the rear end surface of the separator 52 at a lower side.

Instead of the fin portions 52a, the rear end surface of the separator 52 may be formed in a convex and concave shape, or a heat transmission facilitating member such as corrugated fins and fine pin fins may be formed on the outer wall surface of cover 57. Further, a labyrinth seal may be formed between the separator 52 and the rotor 53, and may be used as the heat-generating chamber 50.

Figure 4:
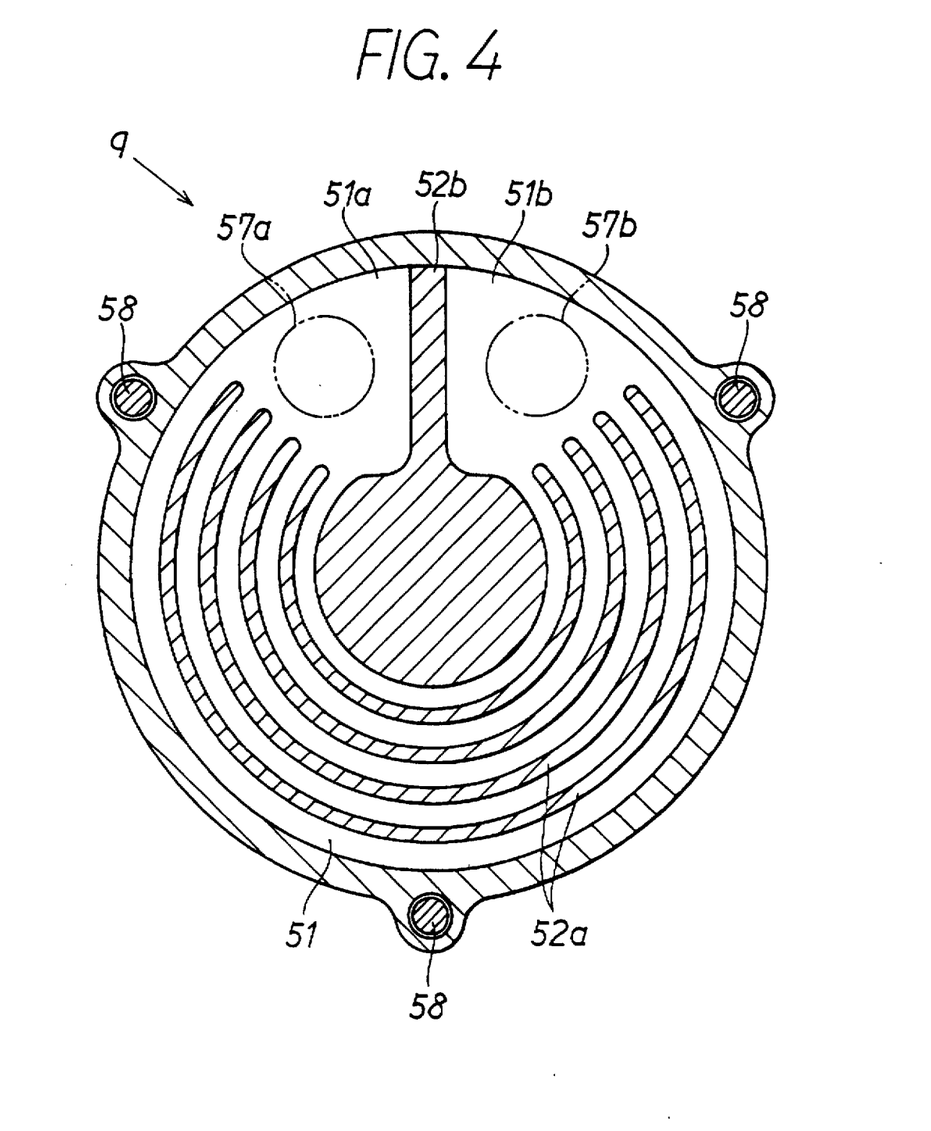
FIG. 4 is a cross-sectional view showing the viscous heater according to the first embodiment.

As shown in FIG. 4, a partition wall 52b for partitioning the cooling water passage 51 into an upstream side water passage 51a and a downstream side water passage 51b is formed to protrude from the rear end surface of the separator 52. An inlet side cooling water pipe 57a through which the cooling water flows into the cooling water passage 51 and an outlet side cooling water pipe 57b through which the cooling water flows out from the cooling water passage 51 are connected to an outer wall portion of the cover 57 near the partition wall 52b.

The rotor 53 is rotatably disposed in the heat-generating chamber 50 and is fixed to an outer periphery of the rear end portion of the shaft 8. A plurality of groove portions (not shown) are formed on an outer peripheral surface or both side wall surfaces of the rotor 53, and a protrusion portion is formed between each of the adjacent groove portions. When the driving force of the engine E is supplied to the shaft 8, the rotor 53 rotates integrally with the shaft to generate a shearing force to the viscous fluid sealed in the heat-generating chamber 50.

Figure 5:
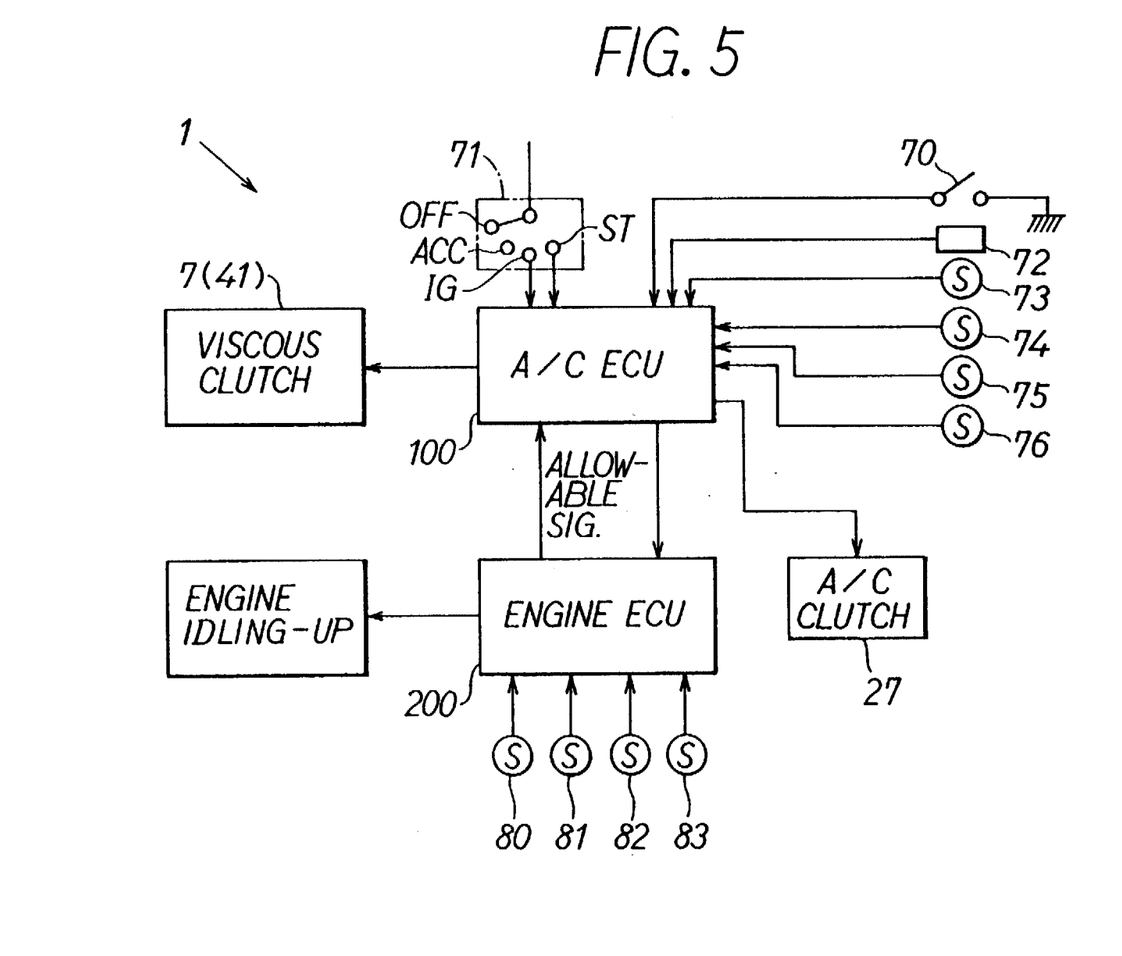
FIG. 5 is a block diagram showing an electric circuit of the air-conditioning apparatus for a vehicle according to the first embodiment.

Next an air-conditioning ECU 100 will be described briefly with reference to FIGS. 1 and 5. FIG. 5 shows an electric circuit of the system 1.

The air-conditioning ECU 100 is an electric circuit for performing a computer control of a cooling and heating equipment such as the compressor and the viscous heater 9 of the air-conditioning unit 2. The air-conditioning ECU 100 is a microcomputer in which a CPU, a ROM, and a RAM are incorporated.

The air-conditioning ECU 100 performs an air-conditioning control for the passenger compartment by controlling a cooling and heating equipment including the electromagnetic coil 41 of the viscous clutch 7, the servomotor 32 of the air-mixing damper 31, and an electromagnetic coil of the air-conditioning clutch 27, and the like, based on input signals from a viscous switch 70, an ignition switch 71, a temperature setting unit 72, an inside air temperature sensor 73, an outside air temperature sensor 74, a sunlight sensor 75, a post-evaporator temperature sensor 76, a cooling water temperature sensor 80 and the engine ECU 200, and a pre-stored control program (see FIG. 6), and the like.

The viscous switch 70 is a switch for preferring a heating operation for the passenger compartment by using the viscous heater 9. When the viscous switch 70 is set on, a heating preference signal is output to the air-conditioning ECU 100. Further, the viscous switch 70 is an economical fuel consumption preference switch for giving an improvement of the fuel consumption rate (i.e., fuel economy) priority. When the viscous switch 70 is set off, a fuel consumption preference signal is output to the air-conditioning ECU 100.

The ignition switch 71 includes each terminal of OFF, ACC, ST and IG. The terminal of ST is a stator operation switch for outputting a signal for supplying an electric current to a stator to the air-conditioning ECU 100.

The temperature setting unit 72 sets a temperature of the passenger compartment to a desired temperature and outputs a set temperature signal to the air-conditioning ECU 100.

The inside air temperature sensor 73 employs a thermistor, for example. The inside air temperature sensor 73 detects a temperature of air in the passenger compartment (i.e., inside air temperature of the passenger compartment), and outputs an inside air temperature detection signal to the air-conditioning ECU 100.

The outside air temperature 74 employs a thermistor, for example. The outside air temperature sensor 74 detects a temperature of air outside the passenger compartment of the vehicle (i.e., outside air temperature), and outputs an outside air temperature detection signal to the air-conditioning ECU 100.

A photo-diode is used as the sunlight sensor 75, for example. The sunlight sensor 75 detects an amount of sunlight entering the passenger compartment, and outputs a sunlight detection signal to the air-conditioning ECU 100.

The post-evaporator temperature sensor 76 employs a thermistor, for example. The post-evaporator temperature sensor 76 detects a temperature of air immediately after passing through the evaporator 26, and outputs a post-evaporator temperature detection signal to the air-conditioning ECU 100.

Hear, the air-conditioning ECU 100 calculates a target air temperature TAO of air blown into the passenger compartment based on a temperature set by the temperature setting unit 72 and an environmental condition detected an environmental condition detection means including the inside air temperature sensor 73, the outside air temperature sensor 74, and the sunlight sensor 75, and the like. Further, a target damper opening degree SW is calculated based on the target air temperature TAO, post-evaporator air temperature detected by the post-evaporator temperature sensor 76, and a cooling water temperature detected by the cooling water temperature sensor 80. Based on the target damper opening degree SW, the water valve 16 and the servomotor 32 of the air-mixing damper 31 are operated to control a temperature of air blown into the passenger compartment. As the environmental condition detection means, an air temperature sensor for detecting a temperature of air blown from either one of the outlets of the duct 21 to the passenger compartment and the like may be used in addition to the inside air temperature sensor 73, the outside air temperature sensor 74, the sunlight sensor 75, the post-evaporator temperature sensor 76, and the cooling water temperature sensor 80 described later.

Next, the engine ECU 200 will be briefly described with reference to FIGS. 1–5.

The engine ECU 200 is an electric circuit for an engine control system for performing a computer control of the engine E. The engine ECU 200 is a microcomputer in which a CPU, a ROM, and a RAM are incorporated.

Figure 6:
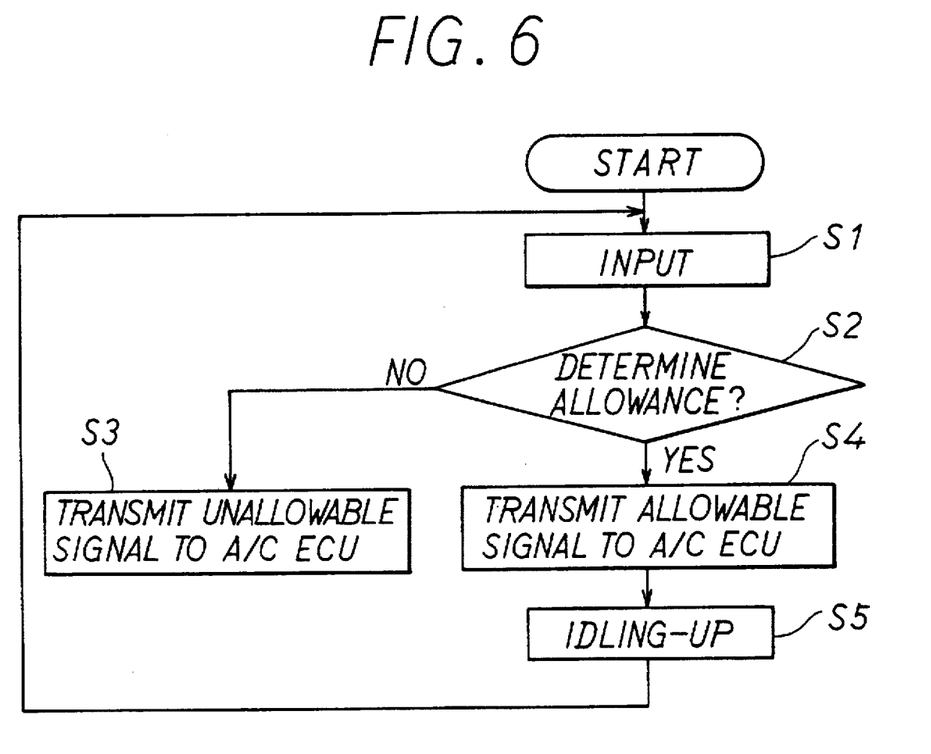
FIG. 6 is a flow chart showing a control program of an engine ECU according to the first embodiment.

The engine ECU 200 performs an idling rotational speed control (i.e., idling-up control) of the engine E, a fuel injection amount control, a fuel injection timing control, an intake air throttle control, an electric current control to a glow plug, and the like, based on the cooling water temperature sensor 80, an engine rotational speed sensor 81, a vehicle speed sensor 82, a throttle opening sensor 83, input signals input from the air-conditioning ECU 100, and the pre-stored control program (reference to FIG. 6). The engine ECU 200 also transmits signals required for processes of the air-conditioning ECU 100 thereto.

The cooling water temperature sensor 80 employs a thermistor, for example, to detect a temperature of the cooling water in the cooling water circuit 3 (in this embodiment, a temperature of the cooling water flowing from the water jacket 13 of the engine E, i.e., engine outlet temperature), and outputs a cooling water temperature detection signal to the engine ECU 200. The cooling water temperature sensor 80 may directly output the cooling water temperature detection signal to the air-conditioning ECU 100.

The engine rotational speed sensor 81 detects a rotational speed of the output shaft 11 of the engine E and outputs an engine rotational speed signal to the engine ECU 200.

As the vehicle speed sensor 82, a reed switch type vehicle speed sensor, a photo-electric type vehicle speed sensor, or a MRE (i.e., Magnetic Resistance Element) type vehicle speed sensor can be used, for example. The vehicle speed sensor 82 detects a speed of the vehicle, and outputs a vehicle speed signal to the engine ECU 200.

The throttle opening sensor 83 detects an opening degree of the throttle valve disposed in an intake pipe of the engine E and outputs a throttle opening signal to the engine ECU 200.

Next, a viscous heater control of the engine ECU 200 will be briefly described with reference to FIGS. 1, 5 and 6. FIG. 6 is a flow chart showing a control program of the engine ECU according to the first embodiment.

Firstly, various kinds of sensor signals and switch signals from the cooling water temperature sensor 80, the engine rotational speed sensor 81, the vehicle speed sensor 82, the throttle opening sensor 83, and the like are input to the engine ECU 200 at step S1.

Next, the engine ECU 200 determines whether or not that the electromagnetic clutch 41 of the viscous clutch 7 is allowable to be turned on at step S2. When the determination is "NO" at the step S2, an unallowable signal for allowing the electromagnetic clutch 41 of the viscous clutch 7 not to be turned on and a cooling water temperature signal detected by the cooling water temperature sensor 80 are transmitted to the air conditioning ECU 100 at step S3. The process at the step S3 may be omitted. Then, it proceeds to the process at the step S1.

When the determination is "YES" at the step S2, an allowable signal for allowing the electromagnetic clutch 41 of the viscous clutch 7 to be turned on and a cooling water temperature signal detected by the cooling water temperature sensor 80 are transmitted to the air conditioning ECU 100 at step S4.

Next, an engine load such as an electric load or a power steering is applied in idling, an amount of intake air is increased so that an idling rotational speed is increased stepwise, that is, an idling-up control is performed at step S5. Nest, it proceeds to the process at the step S1.

Figure 7:
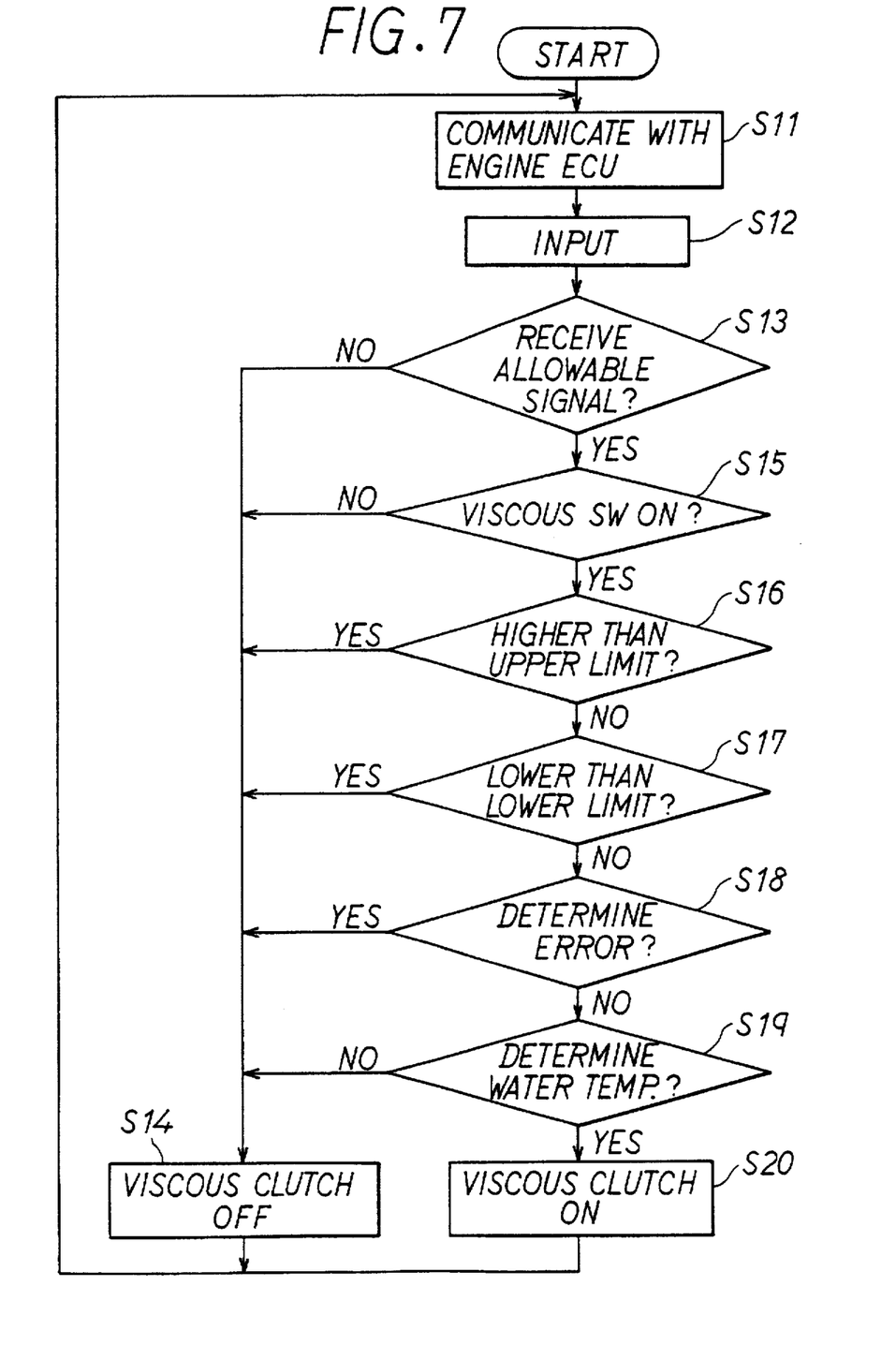
FIG. 7 is a flow chart showing a control program of an air conditioning ECU according to the first embodiment.

Next, a viscous heater control of the air-conditioning ECU 100 will be briefly described with reference to FIGS. 1–9. FIG. 7 is a flow chart showing a control program of the air conditioning ECU according to the first embodiment.

Firstly, at step S11, it performs a communication (transmits a signal to and receives a signal from) with the engine ECU 200.

Next, various kinds of sensor signals such as a cooling water temperature signal input from the cooling water temperature sensor 80, switch signals, and the communication signals from the engine ECU 200 are input ar step S12.

Next, it is determined whether or not the allowable signal for allowing the electromagnetic coil 41 of the viscous clutch 7 to be turned on is received at step S13. When the determination is "NO", the electromagnetic coil 41 of the viscous clutch 7 is turned off at step S14 to prevent an abnormal heat of the viscous fluid to protect the viscous heater 9 and to reduce the load of the engine E. That is, the electric current supplying to the electromagnetic coil 41 of the viscous clutch 7 is stopped and the operation of the viscous heater 9 (i.e., a rotation of the rotor 53) is stopped at the step S14. Next, it proceeds to the process at the step S11.

At the step S13, when the determination is "YES", it is determined whether or not the viscous switch 70 is set on, that is, whether or not the heating preference signal or the economical fuel consumption preference signal is input at step S15. When the determination is "NO" at the step 15, it proceeds to the process at the step S14, and the electromagnetic coil 41 of the viscous clutch 7 is turned off.

On the other hand, when the determination is "YES" at the step 15, it is determined whether or not the cooling water temperature detected by the cooling water temperature sensor 80 is higher than an upper limit (e.g., 80° C.–100° C.) of an allowable range at step S16. When the determination is "YES" at the step S16, it is determined that the two detection lines 84a and 84b or the two communication lines 85a and 85b are shorted. Next, it proceeds to the process at the step S14, and the electromagnetic coil 41 of the viscous clutch 7 is turned off.

At the step S16, when the determination is "NO", it is determined whether or not the cooling water temperature detected by the cooling water temperature sensor 80 is lower than a lower limit (e.g., –20° C. - –30° C.) of an allowable range at step S17. When the determination is "YES" at the step S17, it is determined that any one of the two detection lines 84a and 84b or any one of the two communication lines 85a and 85b is opened. Next, it proceeds to the process at the step S14, and the electromagnetic coil 41 of the viscous clutch 7 is turned off.

Figure 8:
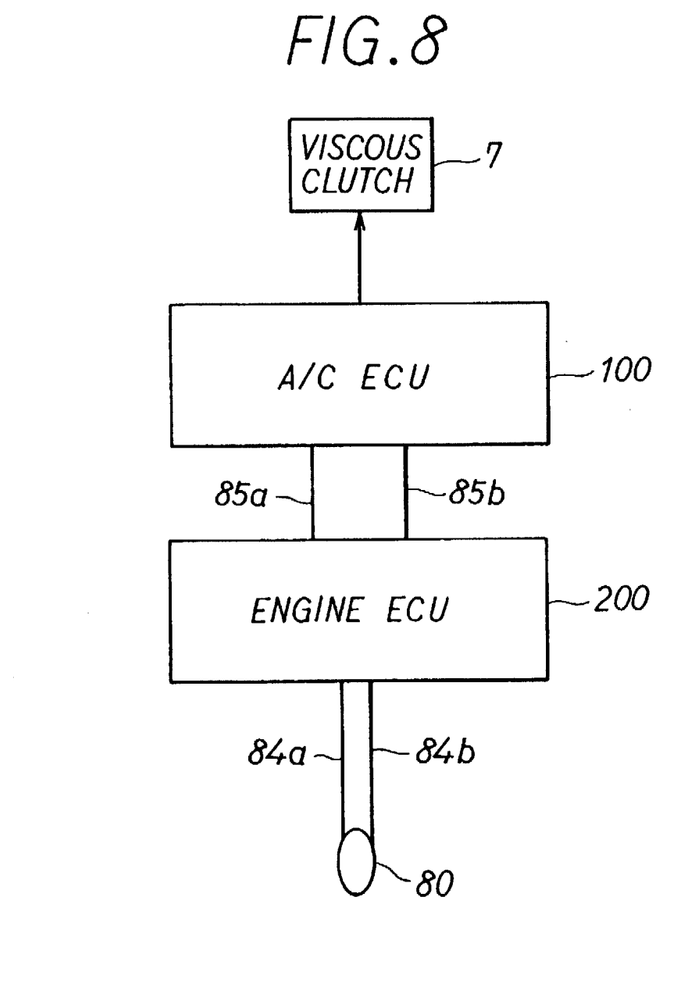
FIG. 8 is a block diagram showing a failure determination circuit of a cooling water temperature sensor and a communication line according to the first embodiment.

Next, a failure determination unit (i.e., erroneous determination unit) of the present invention will be briefly described. A failure determination circuit is constructed by a thermistor where an electric resistance value becomes larger according to temperature. In the failure determination circuit, the cooling water temperature sensor 80 and the engine ECU 200 are electrically directly connected through the two detection lines 84a and 84b, and the engine ECU 200 and the air-conditioning ECU 100 are electrically directly connected through the two communication lines 85a and 85b.

In the first embodiment, when any one of the detection lines 84a and 84b is opened, an electric resistance value input to the engine ECU 200 becomes infinite. When the two detection lines 84a and 84b are shorted, the electric resistance value input to the engine ECU 200 becomes zero.

Further, when any one of the communication lines 85a and 85b is opened, the two communication lines 85a and 85b are shorted, or a noise is generated in the two communication lines 85a and 85b, a receiving signal (e.g., electric current value or electric voltage value) of the air conditioning ECU 100 is different from a normal signal thereof. Thus, when an allowable range for the receiving signal of the air conditioning ECU 100 is set and the receiving signal is outside the allowable range, it can be determined that a failure is generated in the cooling water temperature sensor 80 or in the two communication lines 85a and 85b.

Further, at the step S17, when the determination is "NO", it is determined whether or not an error is generated in the various sensor signals including a cooling water temperature signal input from the cooling water temperature sensor 80 and a communication signal from the engine ECU 200 at step S18. That is, at the step S18, it is determined whether or not any one of the various sensors such as the cooling water temperature sensor 80 or the engine ECU 200 has a failure. As the failure determination unit, a checksum, a CRC or a cyclic code erroneous detection method may be used. When the determination is "YES", it proceeds to the process at the step S14, and the electromagnetic coil 41 of the viscous clutch 7 is set off.

When the determination is "NO" at the step S18, it is determined whether or not the electromagnetic coil 41 of the viscous clutch 7 is set on or off according to the characteristics graph (reference to FIG. 9) of the viscous heater control based on the cooling water temperature, pre-stored in a memory circuit (e.g., ROM). That is, it is determined whether or not the cooling water temperature detected by the cooling water temperature sensor 80 is lower than the set cooling water temperature (i.e., the set value) at step S19. At the step S19, when the determination is "NO", it proceeds to the process at the step S14, and the electromagnetic coil 41 of the viscous clutch 7 is set off.

Figure 9:
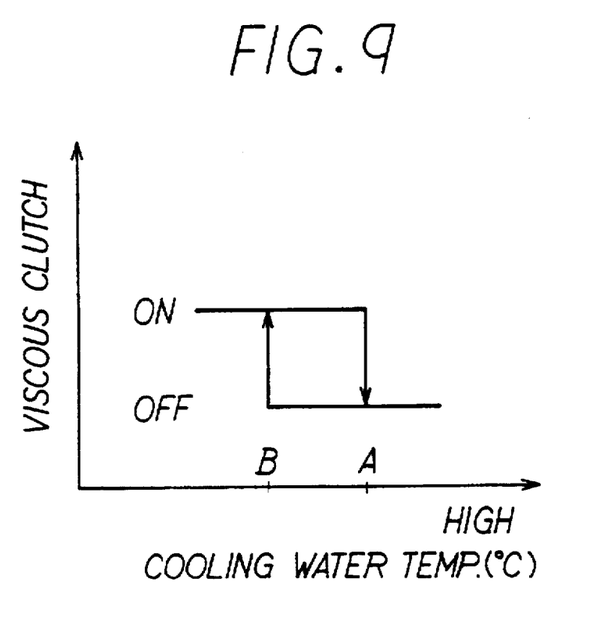
FIG. 9 is a graph for a control process of the air-conditioning ECU, showing a relationship between a cooling water temperature and an operation state of a viscous clutch in the first embodiment.

More specifically, as shown in the characteristics graph of FIG. 9, a hysteresis is given between a first set cooling water temperature A (e.g., 80° C.) and a second set cooling water temperature B (e.g., 70° C.). When the cooling water temperature is higher than the set cooling water temperature, the electromagnetic coil 41 of the viscous clutch 7 is set off. When the cooling water temperature is lower than the set cooling water temperature, the electromagnetic coil 41 of the viscous clutch 7 is set on. In the first embodiment, the upper limit of the allowable range of the cooling water temperature is set at the first set temperature (e.g., 80° C.), and the lower limit of the allowable range of the cooling water temperature is set at a temperature (e.g., –20° C.). The hysteresis is set to the characteristics graph in FIG. 9; however, the hysteresis may not be given. Further, when the upper limit of the allowable range of the cooling water temperature and the first set temperature are corresponded to the same temperature, the above-described step S19 may be omitted.

When the determination is "YES" at the step S19, the electromagnetic coil 41 of the viscous clutch 7 is set on to compensate an insufficient heating capacity in the maximum heating operation. That is, an electric current is supplied to the electromagnetic coil 41 of the viscous clutch 7 so that the viscous heater 9 is operated at step S20. Next, it proceeds to the process at the step S11.

Next, an operation of the system 1 according to the first embodiment will be briefly described with reference to FIGS. 1–9.

When the engine E starts, the output shaft 11 of the engine E rotates, and the driving force of the engine E is transmitted to the rotor 42 through the V-belt 6 of the belt transmitting mechanism 5. However, when the cooling water temperature sensor 80 or any one of the two communication lines 85a and 85b has a failure, the electromagnetic coil 41 of the viscous clutch 7 is turned off. That is, because the electromagnetic coil 41 of the viscous clutch 7 is turned off, the armature 43 is not attracted toward the friction surface of the rotor 42. Thus, at this time, the driving force of the engine E is not transmitted to the inner hub 45 and the shaft 8.

Because the shaft 8 and the rotor 53 do not rotate, a shearing force is not applied to the viscous fluid in the heat-generating chamber 50, and the viscous fluid does not generate heat. Therefore, even if the cooling water heated in the water jacket 13 of the engine E flows through the cooling water passage 51 of the viscous heater 9, the cooling water is supplied to the heater core 15 without being heated. Therefore, the heating operation of the passenger compartment is started with a small heating capacity.

When the viscous switch 70 is set on; the cooling water temperature detected by the cooling water temperature sensor 80 is lower than the set cooling temperature (i.e., the set value) and is in the allowable range; and the allowable signal is received from the engine ECU 200, the electromagnetic coil 41 of the viscous clutch 7 is turned on. Because the electromagnetic coil 41 of the viscous clutch 7 is turned on, the armature 43 is attracted to the friction surface of the rotor 42 by magnetomotive force of the electromagnetic coil 41 to transmit the driving force of the engine E to the inner hub 45 and the shaft 8.

Because the rotor 53 rotates integrally with the shaft 8, a shearing force is applied to the viscous fluid in the heat-generating chamber 50 to generate heat. Therefore, when the cooling water heated in the water jacket 13 of the engine E passes through the cooling water passage 51 of the viscous heater 9, the cooling water is heated while absorbing heat generated in the viscous fluid through the plurality of the fin portions 52a formed integrally with the separator 52. The cooling water heated by the viscous heater 9 is supplied to the heater core 15 so that the heating operation of the passenger compartment is performed with a large heating operation.

The heating capacity of the viscous heater 9 may be set freely in advance by a viscous coefficient of the viscous fluid sealed in the heat-generating chamber 50. That is, the larger the viscous coefficient the viscous fluid has, the larger the shearing force applied by the rotation of the rotor 53 becomes. Therefore, the heat-generating capacity of the viscous heater 9 is increased, and the load and the fuel consumption rate of the engine E become larger. On the other hand, the smaller the viscous coefficient the viscous fluid has, the smaller the shearing force applied by the rotation of the rotor 53 becomes. Therefore, the heat-generating capacity of the viscous heater 9 is decreased, and the load and the fuel consumption rate of the engine E become lower.

As described above, according to the first embodiment, by the operation of the viscous heater 9, the temperature of the cooling water flowing into the heater core 15 rises so that the temperature of the cooling water in the cooling water circuit 3 can be maintained at a predetermined temperature (e.g., 80° C.). Therefore, a radiating amount of the heater core 15 increases, and air sufficiently heated when passing through the heater core 15 is blown into the passenger compartment to prevent the heating capacity for the passenger compartment from being lowered.

Further, according to the first embodiment, even if the cooling water temperature detected by the cooling water temperature sensor 80 is lower than the set cooling water temperature, the electromagnetic coil 41 of the viscous clutch 7 is turned off when the cooling water temperature is lower than the lower limit of the allowable range or a failure is caused in the cooling water temperature sensor 80 or the two communication lines 85a and 85b. Therefore, the driving force of the engine E is not transmitted to the viscous heater 9 through the belt transmitting mechanism 5 and the viscous clutch 7. In this case, even if silicon oil having the high viscosity is used as the viscous fluid in the heat-generating chamber 50, a shearing force is not applied to the viscous fluid from the rotor 53. Therefore, the viscous fluid in the heat-generating chamber 50 does not generates an abnormal heat higher than 250° C., for example. Thus, since the heat deterioration of the viscous fluid and mechanical deterioration due to a shearing force are not generated, the viscosity and the heat-generating efficiency of the viscous fluid are not decreased. Therefore, after correcting a failure of the cooling water temperature sensor 80 or a failure of the two communication lines, a sufficient heating capacity can be obtained when a heating operation for the passenger compartment is necessary.

In the system 1 according to the first embodiment, when the air-conditioning ECU 100 does not receive the allowable signal from the engine ECU 200, the electromagnetic coil 41 of the viscous clutch 7 is set off. Therefore, it is possible to reduce the load of the engine E and to improve the running performance and the driveability of the vehicle. Further, since the load of the engine E and the load of the belt transmission mechanism can be decreased, the fuel consumption rate of the engine E can be lowered.

Figure 10:
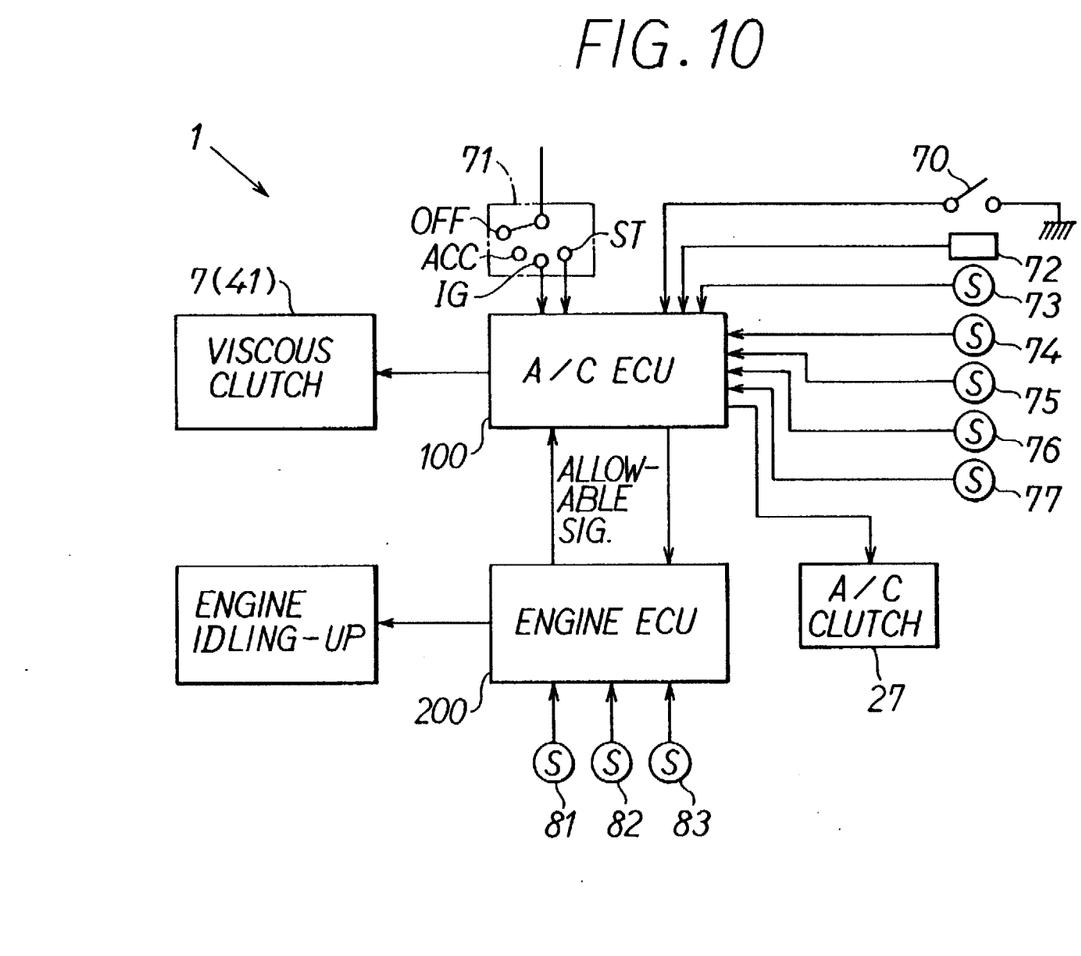
FIG. 10 is a block diagram showing an electric circuit of the air-conditioning apparatus for a vehicle according to a second preferred embodiment of the present invention.
Figure 11:
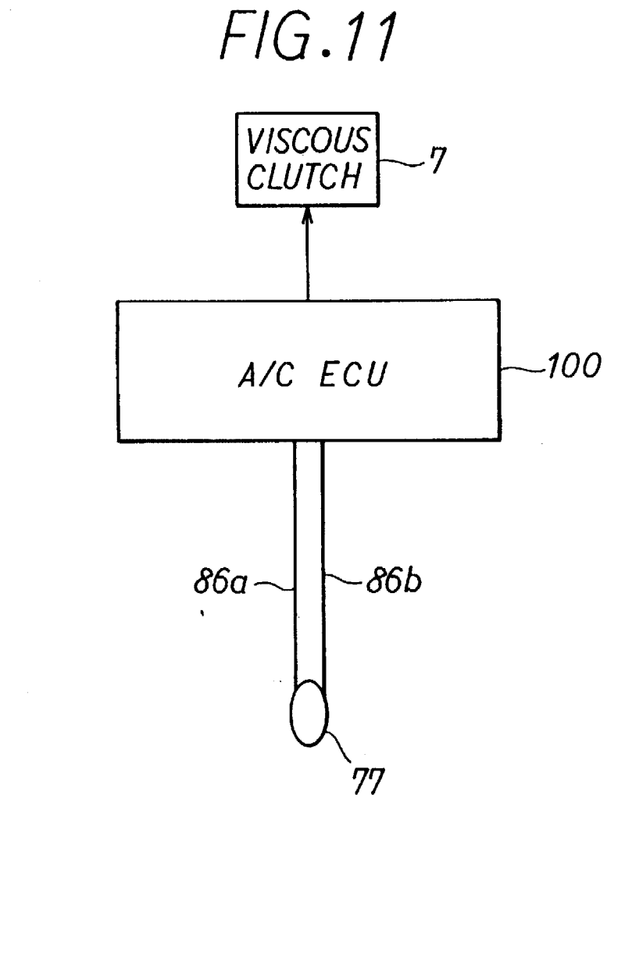
FIG. 11 is a block diagram showing a failure determination circuit of a cooling water temperature sensor according to the second embodiment.

A second preferred embodiment of the present invention will be described with reference to FIGS. 10 and 11. FIG. 10 shows an electric circuit for an air-conditioning apparatus according to the second embodiment. FIG. 11 is a block diagram showing a failure determination circuit of a cooling water temperature sensor according to the second embodiment.

As shown in FIG. 11, the failure determination circuit of the cooling water temperature sensor 77 of the second embodiment is constructed by a thermistor. In the failure determination circuit, the cooling water temperature sensor 77 and the air conditioning ECU 100 are electrically directly connected through two detection lines 86a and 86b when any one of the detection lines 86a and 86b is opened (broken), an electric resistance value input to the air conditioning ECU 100 becomes infinite. When the two detection lines 86a and 86b are shorted, the electric resistance value input to the air conditioning ECU 100 becomes zero.

When the electric resistance value is infinite, the cooling water temperature corresponds to −50° C. When the electric resistance value is zero, the cooling water temperature corresponds to 200° C. Thus, when the cooling water temperature (i.e., electric resistance value) input to the air conditioning ECU 100 is higher than the upper limit (e.g., 85° C.–100° C.), it can determined that the cooling water temperature sensor 77 has a failure. Further, when the cooling water temperature (i.e., electric resistance value) input to the air conditioning ECU 100 is lower than the lower limit (e.g., −20° C. - −30° C.), it can determined that the cooling water temperature sensor 77 has a failure. In this way, the effects similar to those in the first embodiment can be obtained.

Figure 12:
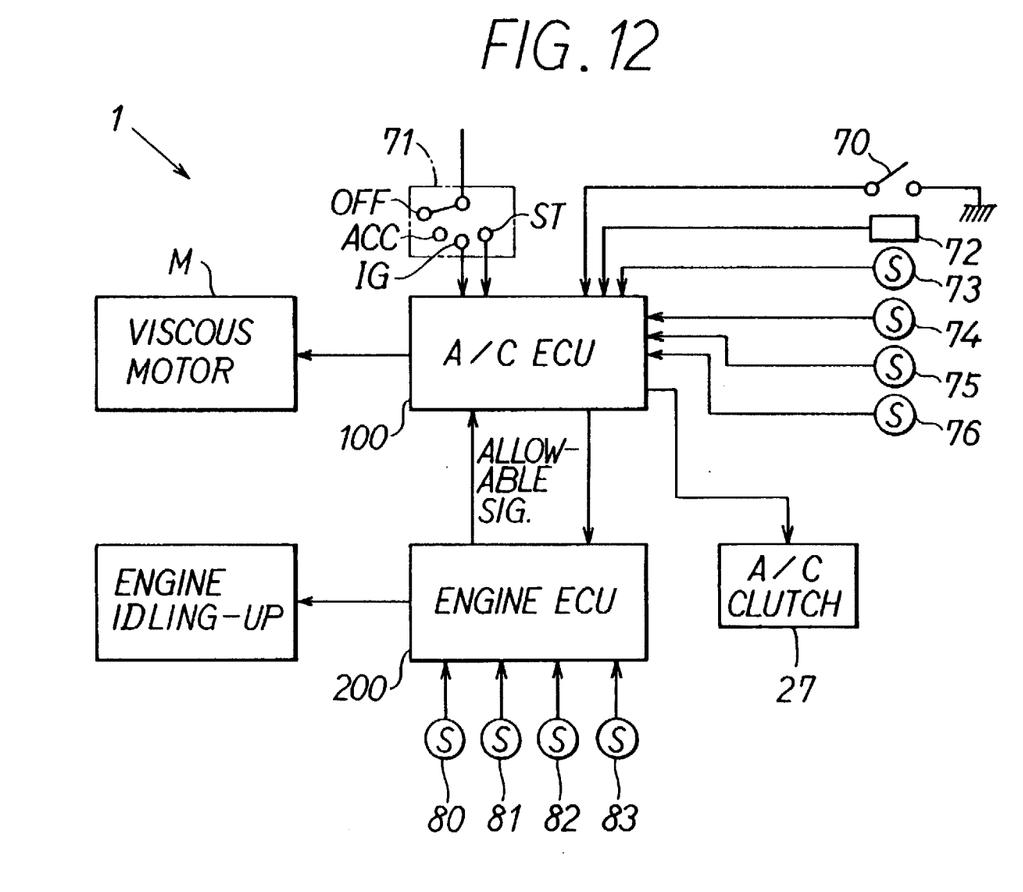
FIG. 12 is a block diagram showing an electric circuit of the air-conditioning apparatus for a vehicle according to a third preferred embodiment of the present invention.

A third preferred embodiment of the present invention will be described with reference to FIG. 12. FIG. 12 shows an electric circuit for an air-conditioning apparatus of the first embodiment.

In the third embodiment, instead of the engine E, an electric motor M (herein after referred to as "viscous motor") is used as the driving source for driving the shaft 8 and the rotor 53 of the viscous heater 9. When the cooling water temperature sensor 80 or the engine ECU 200 has a failure, the viscous motor M is set off so that the shaft 8 and the rotor 53 of the viscous heater 9 do not rotate. Thus, the abnormal heat generated in the viscous fluid of the heat-generating chamber can be prevented so that the effects similar to those in the first embodiment can be obtained.

Although the present invention has been fully described in connection with preferred embodiments thereof with reference to the accompanying drawings, it is to be noted that various changes and modifications will become apparent to those skilled in the art.

For example, in each of the above-described embodiments, the belt transmitting mechanism 5 and the viscous clutch 7 are connected to and driven by the output shaft 11 of the engine E to rotate the shaft 8 of the viscous heater 9; however, the viscous clutch 7 may be directly connected to the output shaft 11 of the engine E to rotate the shaft 8 of the viscous heater 9. Further, a gear transmission having at least one stage gear or a V-belt type non-stage transmission may be connected between the output shaft 11 of the engine E and the viscous clutch 7 or between the viscous clutch 7 and the shaft 8 of the viscous heater 9.

In the above-described embodiments, the V-belt 6 of the belt transmission mechanism 5 are hung on both of the viscous clutch 7 and the air conditioning clutch 27; however, the V-belt 6 of the belt transmission mechanism 5 may be hung on a supplementary equipment such as the water pump 14, a hydraulic pump for power steering, a hydraulic pump for supplying operation oil to the automatic transmission, or a hydraulic pump for supplying lubricating oil to the engine E with the viscous clutch 7.

In each of the above-described embodiment, a water-cooled diesel engine is used as the engine E; however, the other water-cooled engine such as a gasoline engine may be used. Further, the rotor 53 of the viscous heater 9 may be driven by the other water-cooled engine or an air-cooled engine, which are not used as the above-described engine E and as the heating source.

In each of the above-described embodiments, the present invention is applied to an air-conditioning apparatus for a vehicle to perform a heating operation and a cooling operation for the passenger compartment; however, the present invention may be applied to an air-conditioning apparatus for a vehicle to perform only a heating operation for the passenger compartment.

In each of the above-described embodiments, the cooling water temperature sensor 77 and 80 is used as means for detecting a physical amount relative to an oil temperature of viscous fluid in the heat-generating chamber 50; however an oil temperature sensor for directly detecting the oil temperature of the viscous fluid in the heat-generating chamber 50 may be used as the physical amount detection means. Further, there may be used means for detecting a temperature of the separator 52 of the viscous heater 9. Still further, there may be used means for detecting a temperature of air blown from the heater core in the duct.

In each of the above-described embodiments, the cooling water temperature sensor 77 and 80 for detecting a temperature of the cooling water at an outlet side of the engine E is used; however, a cooling water temperature sensor for detecting a temperature of the cooling water at an inlet side of the heater core 15 may be used. Further, a cooling water temperature sensor for detecting a temperature of the cooling water at an outlet side of the cooling water pipe 57b of the cooling water passage 51 of the viscous heater 9 may be used.

Such changes and modifications are to be understood as being within the scope of the present invention as defined by the appended claims.

What is claimed is:

1. A heating apparatus for heating a passenger compartment of a vehicle having a water-cooled engine, comprising:
   a heating heat exchanger for heating said passenger compartment by performing heat-exchange between cooling water having cooled said water-cooled engine and air to be blown into said passenger compartment;
   a heat-generating unit using a shearing force, said heat-generating unit including a rotor which rotates when a driving force is applied thereto and a heat-generating chamber for sealing therein viscous fluid which generates heat for heating said cooling water to be supplied to said heating heat exchanger when a shearing force generated by a rotational force of said rotor is applied to said viscous fluid;
   a shearing state switching unit for switching a shearing state of said viscous fluid by the rotational force of said rotor;
   a viscous fluid temperature physical amount detecting unit for detecting a physical amount relative to a temperature of said viscous fluid in said heat-generating chamber; and
   a heating control unit for controlling said shearing state switching unit to apply a shearing force to said viscous fluid by the rotational force of said rotor when said physical amount detected by said viscous fluid temperature physical amount detecting unit is lower than a set value,
   wherein said heating control unit includes a failure determination unit for determining whether or not said viscous fluid temperature physical amount detecting unit has a failure, and controls said shearing state switching unit to stop a shearing force applied to said viscous fluid by the rotational force of said rotor when said failure determination unit determines that said viscous fluid temperature physical amount detecting unit has a failure.

2. A heating apparatus according to claim 1, wherein said shearing state switching unit is a clutch for switching a transmission of the driving force, from said engine to said rotor.

3. A heating apparatus according to claim 1, wherein said shearing state switching unit is a viscous fluid shearing operation switching unit for switching a viscous fluid shearing operation by the rotational force of said rotor.

4. A heating apparatus according to claim 1, wherein said failure determination unit determines said viscous fluid temperature physical amount detecting unit has a failure, based on an electric signal.

5. A heating apparatus according to claim 1, wherein said failure determination unit determines that said viscous fluid temperature physical amount detecting unit has a failure when said physical amount detected by said viscous fluid temperature physical amount detecting unit is lower than a lower limit of an allowable range.

6. A heating apparatus according to claim 1, wherein,
said failure determination unit determines that said viscous fluid temperature physical amount detecting unit has a failure when said physical amount detected by said viscous fluid temperature physical amount detecting unit is higher than an upper limit of said allowable range, and said upper limit of said allowable range is equal to or higher than said set value.

7. A heating apparatus according to claim 1, wherein said viscous fluid temperature physical amount detecting unit is cooling water temperature detecting means for detecting a temperature of said cooling water having cooled said engine.

8. A heating apparatus for heating a passenger compartment of a vehicle having a water-cooled engine, comprising:

a heating heat exchanger for heating said passenger compartment by heat-exchange between cooling water having cooled said water-cooled engine and air to be blown into said passenger compartment;

a heat-generating unit using a shearing force, said heat-generating unit including a rotor which rotates when a driving force of a driving source is applied thereto and a heat-generating chamber for sealing therein viscous fluid which generates heat for heating said cooling water to be supplied to said heating heat exchanger when a shearing force generated by a rotational force of said rotor is applied to said viscous fluid;

a viscous fluid temperature physical amount detecting unit for detecting a physical amount relative to a temperature of said viscous fluid in said heat-generating chamber; and a heating control unit for controlling said driving source to rotate said rotor when said physical amount detected by said viscous fluid temperature physical amount detecting unit is lower than a set value, wherein said heating control unit includes a failure determination unit for determining whether or not said viscous fluid temperature physical amount detecting unit has a failure, and controls said driving source to stop a rotation of said rotor when said failure determination unit determines that said viscous fluid temperature physical amount detecting unit has a failure.

9. A heating apparatus according to claim 8, wherein said driving source is a viscous motor for rotating said rotor of said heat-generating unit.

10. A heating apparatus according to claim 8, wherein said failure determination unit determines that said viscous fluid temperature physical amount detecting unit has a failure when said physical amount detected by said viscous fluid temperature physical amount detecting unit is lower than a lower limit of an allowable range.

11. A heating apparatus according to claim 8, wherein,
said failure determination unit determines that said viscous fluid temperature physical amount detecting unit has a failure when said physical amount detected by said viscous fluid temperature physical amount detecting unit is higher than an upper limit of said allowable range; and said upper limit of said allowable range is equal to or higher than said set value.

12. A heating apparatus according to claim 8, wherein said viscous fluid temperature physical amount detecting unit is cooling water temperature detecting means for detecting a temperature of said cooling water having cooled said engine.

* * * * *

UNITED STATES PATENT AND TRADEMARK OFFICE
CERTIFICATE OF CORRECTION

PATENT NO. : 5,755,379

DATED : May 26, 1998

INVENTOR(S) : Yuji Ito

It is certified that error appears in the above-identified patent and that said Letters Patent is hereby corrected as shown below:

Title Page, [56] Ref. Cited, JP-A-6-92134, "3/1994" should be --4/1994--

Col. 1, line 29, delete 2nd occurrence of "of" and substitute --on-- therefor

Col. 3, line 46, delete "circuits" and substitute --circulates-- therefor

Col. 3, line 59, delete "circuits" and substitute --circulates-- therefor

Col. 5, line 46, delete "supplying" and substitute --supplied-- therefor

Col. 6, line 14, "C-ring" should be --O-ring--

Col. 6, line 66, delete 2nd occurrence of "a"

Col. 7, line 6, delete "a"

Col. 7, line 57, delete "Hear," and substitute --Here,--

Col. 7, line 60, after "detected" insert --by--

Col. 9, line 17, delete "Nest," and substitute --Next,-- therefor

Col. 9, line 28, delete "ar" and substitute --at-- therefor

Col. 9, line 36, delete "supplying" and substitute --supplied-- therefor

Col. 11, line 36, delete "on;" and substitute --on,-- therefor

Col. 12, line 31, delete "generates" and substitute --generate-- therefor

Col. 12, line 62, delete "86b when" and substitute --86b. When-- therefor

UNITED STATES PATENT AND TRADEMARK OFFICE
CERTIFICATE OF CORRECTION

PATENT NO. : 5,755,379
DATED : May 26, 1998
INVENTOR(S) : Yuji Ito

It is certified that error appears in the above-identified patent and that said Letters Patent is hereby corrected as shown below:

Col. 13, line 11, after "can" insert --be--

Col. 13, line 19, "(herein after" should be --(hereinafter--

Col. 13, line 49, delete "a"

Col. 13, line 54, delete "embodiment" and substitute --embodiments--therefor

Col. 13, lines 55-56, delete "the other" and substitute --another-- therefor

Signed and Sealed this

Sixth Day of April, 1999

Q. TODD DICKINSON

*Attest:*

*Attesting Officer*  Acting Commissioner of Patents and Trademarks